Aug. 3, 1926.

T. D. STANLEY ET AL 1,594,574

STEERING WHEEL LOCK

Filed Jan. 15, 1923    2 Sheets-Sheet 1

INVENTORS
Theodore D. Stanley,
Sidney Bakewell.
BY Rex Frye.
ATTORNEY

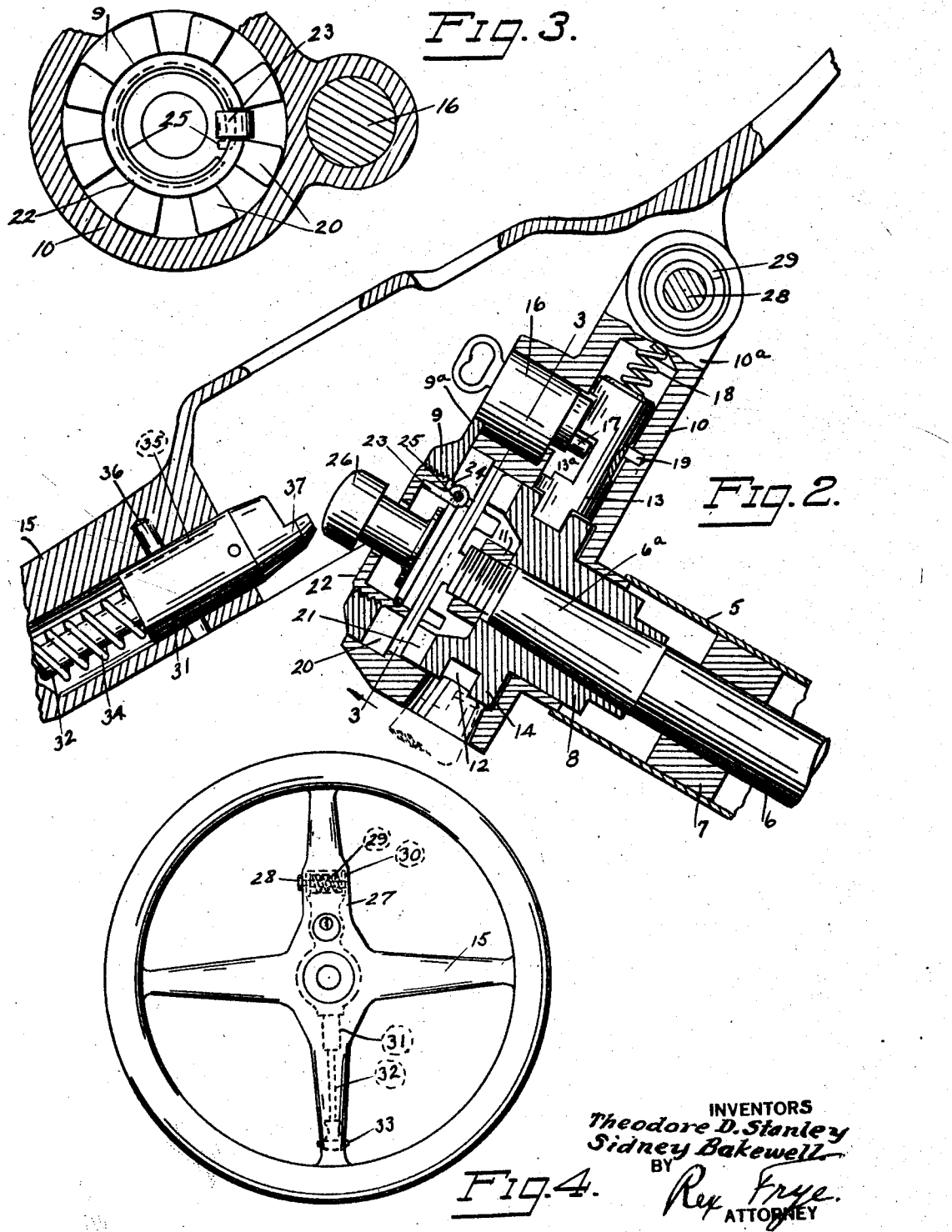

Patented Aug. 3, 1926.

1,594,574

UNITED STATES PATENT OFFICE.

THEODORE D. STANLEY AND SIDNEY BAKEWELL, OF DETROIT, MICHIGAN, ASSIGNORS TO LELAND LOCK COMPANY, OF DETROIT, MICHIGAN.

STEERING-WHEEL LOCK.

Application filed January 15, 1923. Serial No. 612,669.

This invention relates to lock-controlled steering wheels for automobiles and other vehicles. and has for its primary object the provision of safe and reliable securing means whereby the steering wheel may be quickly rendered operative or inoperative at will and locked in its inoperative position.

A further object of the invention is to mount a tiltable steering wheel upon one portion of a locking mechanism and secure another portion of the locking mechanism to the steering post, whereby when the portions of the locking mechanism are interengaged the vehicle may be conveniently steered from the steering wheel, and when disengaged the wheel is free to move without turning the steering mechanism.

The above and other objects of our invention will be apparent from the following description wherein reference is made to the accompanying drawings illustrating a preferred embodiment of our invention, and wherein similar reference numerals designate similar parts throughout the several views.

In the drawings:—

Fig. 2 is a view similar to Fig. 1 showing the position assumed by the steering and locking mechanism when the wheel is in inoperative or "locked free" position, the wheel being shown in another position assumed in tilting;

Fig. 3 is a detail sectional view taken substantially on the line 3—3 of Fig. 2 looking in the direction of the arrow, and Fig. 4 is a plan view of the steering wheel in operative position.

Figure 1:
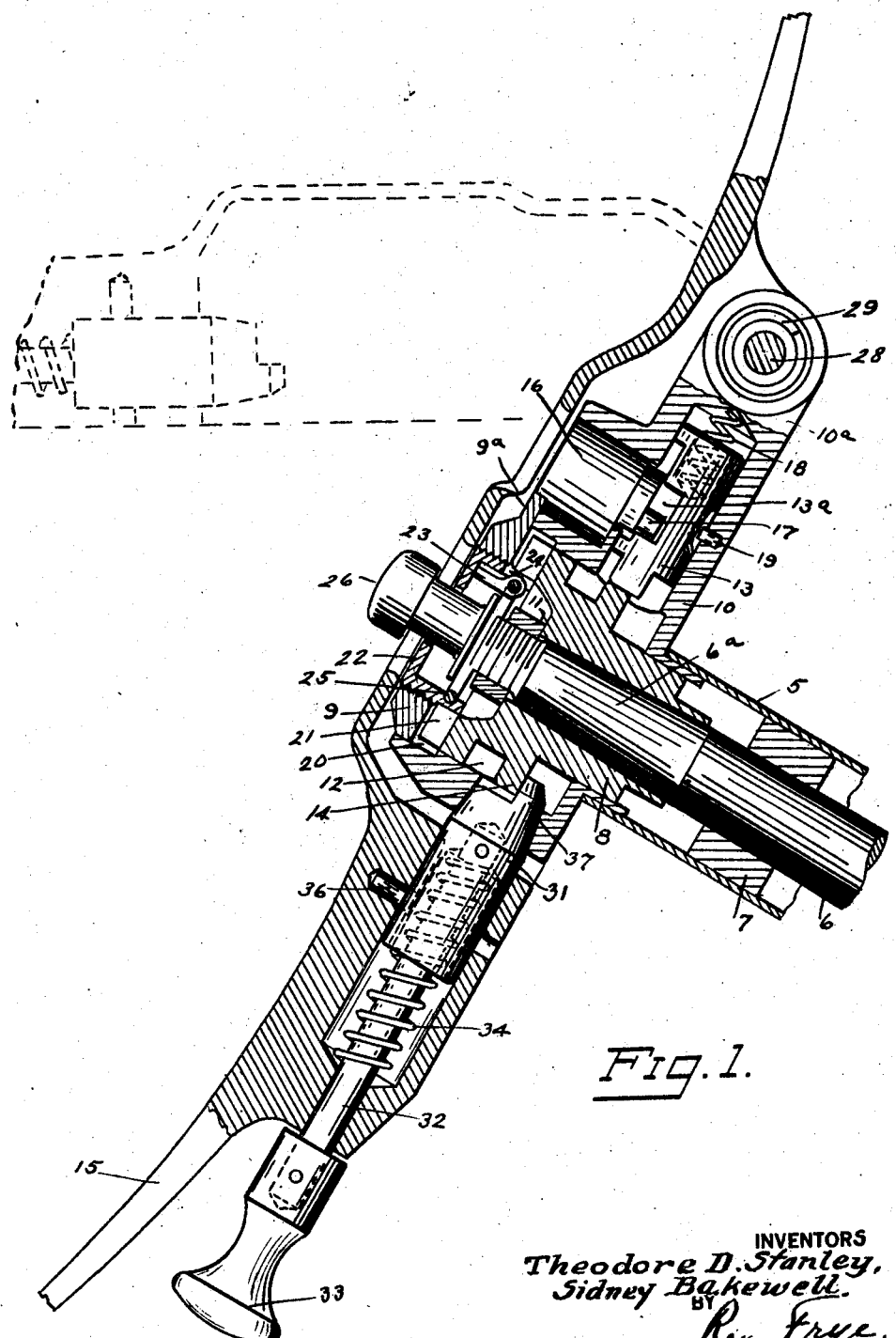
Fig. 1 is a central sectional view through the steering and locking mechanism in the position assumed on the vehicle when the wheel is in operative or "service" position, with the dotted line position showing one position of the wheel when tilted.

Referring now to the drawings the numeral 5 designates the tubular housing of an automobile steering column and 6 the rotatable steering post or shaft mounted substantially centrally of the column 5 and supported therein by bearings 7 in the usual or any desired manner. The upper end of the steering post 6 is preferably tapered, substantially as shown at 6ª, and receives the bushing 8 forming the lower member of a crown clutch, the upper member of which is herein shown as an annular member 9 carried by the hub casing 10 as hereinafter described. The bushing 8 has a central tapered socket adapted to snugly fit over the tapered end 6ª of the steering post and may be further secured thereto by a spline or other suitable means so as to always rotate with the steering post. A nut 11 is threaded on the tip of the steering post and locks the bushing 8 in position. The outer wall of the bushing 8 is preferably circular and forms a guide for the sliding movements of the hub member 10, as hereinafter described, an annular locking groove 12 being formed in the periphery of the bushing, substantially as shown in Figs. 1 and 2, for the reception of a locking bolt 13. A second annular groove is provided below the groove 12, preferably by cutting away the outer portion of the bushing adjacent its lower end, whereby an annular shoulder 14 is provided below the locking groove 12, which shoulder is used to form a latching member to prevent accidental dislocation between the steering wheel 15 and the hub member 10, as hereinafter described.

The hub member 10 is preferably formed with a main portion having a central socket of a diameter but slightly larger than the diameter of the bushing 8, and with a projecting lug 10ª forming a fulcrum bracket upon which the steering wheel 15 is adapted to tilt. The member 10 is also designed to carry the lock unit 16 controlling the movement of the locking bolt 13. This lock unit may be of the usual multi-tumbler type and carries a lug 17 projecting into a slot 13ª in the locking bolt 13, a spring 18 being arranged to normally press the locking bolt toward the bushing 8 secured on the steering post. A stud 19 may also be arranged to prevent accidental rotation of the lock bolt.

As shown best in Fig. 2 the hub member 10 carries at its upper extremity the upper member 9 of the crown clutch whereby the wheel hub and steering post are engaged when in operative position, spaced depending lugs 20 being arranged circumferentially about the member 9 for interengagement between the upwardly projecting lugs 21 carried upon the top of the bushing 8.

When the lugs 20 and 21 are interengaged, as shown in Fig. 1, the steering post 6 will be rotated from the steering wheel, and when the lugs are disengaged, as shown in Fig. 2, the steering wheel may revolve freely without affecting the position of the steering post.

The clutch member 9 is preferably formed separately from and then secured within a recess in the hub member 10, whereby access is provided to the interior of the hub member for accurate machining. Provision may also be made for permitting this member 9 to secure the lock unit 16 in position. As herein shown a shoulder 9ª is provided in overlapping position on a shoulder of the lock unit, whereby the lock unit could not be removed from the hub assembly without the removal of the clutch member 9. Provision is had against the unwarranted removal of the clutch member 9 and also against the removal of the nut 11 of the steering post by threading a cover nut 22 into the member 9, substantially as shown in Fig. 2. The cover nut 22 is of greater depth than the solid portion of the member 9 and carries a locking dog 23 adapted to extend through a slot 24 in the lower portion of the periphery of the nut, whereby when the nut 22 is threaded into the member 9, to substantially the position shown in Fig. 2, a portion of the locking dog 23 extends under the adjacent portion of the member 9. The locking dog 23 is preferably pivotally mounted upon a spring 25 so that the projecting portion of the dog may be sprung inwardly while the nut is being threaded into the member 9, and also to permit the dog to move inwardly whenever the clutch member 9 is moved into engagement with the clutch lugs of the bushing 8 on the steering post.

This arrangement affords a means for preventing the unwarranted removal of the nut 22, and thereby of the cover 9, because the locking dog engages under the adjacent section of the member 9 and prevents rotation of the nut 22 for a further distance than the adjacent clutch lugs 20. At the same time it is possible to readily remove the cover nut 22 whenever the wheel is in engagement with the steering post, because the clutch lugs 21 on the bushing 8 force the locking dog 23 inwardly on its spring mounting so as to maintain the projecting portion of the lug within the area of the cover nut. The member 9 is preferably press-fitted into the recess in the upper portion of the member 10 and then, if desired, the upper edge of the recess struck or spun to overlap the adjacent edge of the member 9, whereby the member 9 is securely held within the recess.

A horn button 26 may be arranged to project through the cover nut 22 and operate a switch in the usual or any desired manner.

The wheel 15 may be of any desired size and shape, but is herein shown as having a spider portion formed of metal with depending sides 27 adapted to fit over the hub member 10 when the wheel is in operative or "service" position. The side walls 27 are apertured to receive a bolt 28 passing through the projecting lug 10ª on the hub member, a spring 29 being preferably arranged to encircle the bolt 28 within the lug and press friction discs 30 against the side walls 27, whereby the wheel 15 may be held by friction in any adjusted position. The wheel 15 also carries a safety latch 31 comprising a pull rod 32 having a handle or knob 33 at its outer end and actuated by a spring 34 to normally press the inner extremity into engagement with the bushing 8 on the steering post, a limiting groove 35 co-acting with a stud 36 serving to control the extent of movement of the latch. The inner end of the latch 31 is formed with a lug 37 adjacent the lower half of the latch and preferably flattened on its upper surface for engagement with the under side of the shoulder 14 on the bushing 8 (see Fig. 1).

In operation, when the parts of the wheel and steering post assembly are in the positions shown in Fig. 1, the steering post 6 may be rotated from the wheel 15 according to the will of the driver. This is the operative or "service" position. Assuming now that the driver is about to leave his car and desires to establish and leave the wheel locked in inoperative position, he will pull out the knob 33 of the safety latch, thereby releasing the lug 37 from the shoulder 14 of the steering post bushing, and the wheel can then be lifted by hand to disengage the lugs 20 of the upper clutch member from the lugs 21 of the lower clutch member. When these clutch members become fully disengaged the lock bolt 13 automatically springs into the annular groove 12 in the bushing 8, thereby locking the wheel in the inoperative position shown in Fig. 2, in which position the wheel is freely or idly revoluble about the steering post. At the same time the raising of the upper clutch member releases the spring-actuated locking dog 23, which enters between the lugs 20 of the clutch member into position below the adjacent portion of the cover member 9 so as to prevent unscrewing and removal of the cover nut 22, and thus the entire assembly is locked so as to prevent disassembling and removing the parts from the steering post until the upper clutch member is again restored to position engaging the lower clutch member. It will be observed that this locking of the wheel in its inoperative position can be accomplished without the use of a key.

To return to service position the driver inserts his key and, by giving the key and lock cylinder a half turn from the position shown in Fig. 2, withdraws the lock bolt 13 from the groove 12, thereby permitting the steering wheel and hub member to be lowered into engagement with the steering post through the cooperating crown clutch members, the wheel being slightly turned if necessary to bring the depending lugs 20 between the lugs 21 on the bushing 8. This lowering of the steering wheel springs the locking dog 23 inwardly so that the cover nut 22 can now be unscrewed if desired to permit the withdrawal of the nut 11 on the steering post, or such other changes as may be desired.

The tilting feature of the wheel is best shown from the full and dotted line positions in Figs. 1 and 2. The bolt 28 forms a fulcrum for the steering wheel which may be swung with such bolt as its center to any desired position. Ordinarily the steering wheel is raised to a substantially vertical position to give additional room for the driver in alighting from the car. The spring 29 and friction discs 30 permit the steering wheel to be held in any adjusted position without, however, preventing the ready return of the wheel to "service" position whenever desired.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

Having described our invention, we claim:—

1. A device of the class described comprising, in combination, a steering post and wheel clutch connected therewith, the wheel being axially movable on the post for disconnecting the clutch means and thereby permitting the wheel to be revolved inoperatively; a nut screwed on the upper end of the post; means for locking the wheel in inoperative position; and means controlled by the axial movement of the wheel for preventing removal of said nut when the wheel is in inoperative position.

2. In a steering device for vehicles, a steering post; a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post; a nut screwed on the post; automatic means under the control of the longitudinal movement of the wheel for preventing removal of the nut when the wheel is in said second position; and releasable retaining means for maintaining the wheel in a desired position; the wheel being freely movable longitudinally with respect to the post when the retaining means is released.

3. A device of the class described comprising a steering post, a bushing secured thereto and having spaced clutch lugs on its upper face and a pair of spaced circumferential grooves in its periphery; a steering member having a hub portion adapted to slide longitudinally of the post and provided with depending clutch lugs adapted to interfit with the clutch lugs on said bushing; locking means engaged in one of the grooves of the bushing for securing the hub member with its clutch lugs in spaced relation with the lugs of the bushing; a safety latch carried by the steering member and adapted to engage in the other groove of the bushing to hold the clutch lugs of the hub and bushing in their interfitting position.

4. A device of the class described comprising a steering post, a bushing secured thereon and provided with spaced clutch lugs on its upper face; a steering member including a hub slidable longitudinally of the post and mounted over said bushing; a removable member secured in the top of the hub and carrying depending clutch lugs arranged to interfit with the lugs on the bushing; and means for preventing the removal of said last mentioned member whenever the clutch lugs of the hub and bushing are disengaged, including a cover nut threaded in the hub member and carrying a locking dog arranged to project through the side wall of the cover nut into the space between a pair of the depending lugs.

5. A device of the class described comprising a steering post, a bushing secured thereon and provided with spaced clutch lugs on its upper face; a steering member including a hub slidable longitudinally of the post and mounted over said bushing; a removable member secured in the top of the hub and carrying depending clutch lugs arranged to interfit with the lugs on the bushing; means for preventing the removal of said last mentioned member whenever the clutch lugs of the hub and bushing are disengaged, including a cover nut threaded in the hub member and carrying a locking dog arranged to project through the side wall of the cover nut into the space between a pair of the depending lugs; and means for resiliently mounting said locking dog to permit its automatic retraction within the area of the cover nut whenever the clutch lugs on the bushing and hub member are interengaged.

6. A device of the class described comprising a steering post with threaded upper extremity, a bushing mounted on the post and having spaced clutch lugs on its upper face, a nut threaded on the post to prevent longitudinal movement of the bushing, a steering wheel having a hub portion adapted to slide longitudinally of the post and provided with depending clutch lugs adapted to interfit with the clutch lugs on said bushing, a cover nut threaded in said hub above the nut threaded on said post, and means controlled by the movement of the hub portion for permitting the removal of said cover nut when said clutch lugs are in interfitting position and for preventing the removal of the cover nut when said clutch lugs are not interfitted.

7. A device of the class described comprising a steering post with threaded upper extremity, a bushing mounted on the post and having spaced clutch lugs on its upper face, a nut threaded on the post to prevent longitudinal movement of the bushing, a steering wheel having a hub portion adapted to slide longitudinally of the post and provided with depending clutch lugs adapted to interfit with the clutch lugs on said bushing, a lock bolt mounted in the wheel and slidable into locking engagement with the bushing, a key operated lock unit for sliding the lock bolt at will, removable means on the wheel overlapping the lock unit, a cover nut mounted on the wheel above the nut on the post, and means operable only when said lugs are not interfitted to prevent the removal of said nuts and lock unit.

In witness whereof we hereunto set our hands.

THEODORE D. STANLEY.
SIDNEY BAKEWELL.